(12) United States Patent
Shimbo et al.

(10) Patent No.: US 11,239,714 B2
(45) Date of Patent: Feb. 1, 2022

(54) ROTATING ELECTRICAL MACHINE

(71) Applicant: TDK Corporation, Tokyo (JP)

(72) Inventors: Nobuyuki Shimbo, Tokyo (JP); Koji Mitake, Tokyo (JP); Toshihiro Kuroshima, Tokyo (JP)

(73) Assignee: TDK Corporation, Tokyo (JP)

( * ) Notice: Subject to any disclaimer, the term of this patent is extended or adjusted under 35 U.S.C. 154(b) by 85 days.

(21) Appl. No.: 16/866,756

(22) Filed: May 5, 2020

(65) Prior Publication Data
US 2020/0366144 A1 Nov. 19, 2020

(30) Foreign Application Priority Data

May 17, 2019 (JP) .............................. JP2019-094023

(51) Int. Cl.
| | | |
|---|---|---|
| *H02K 1/27* | (2006.01) | |
| *H02K 15/03* | (2006.01) | |
| *H01F 13/00* | (2006.01) | |
| *H01F 1/22* | (2006.01) | |
| *H02K 21/14* | (2006.01) | |

(52) U.S. Cl.
CPC ............. *H02K 1/276* (2013.01); *H01F 1/22* (2013.01); *H01F 13/003* (2013.01); *H02K 15/03* (2013.01); *H02K 21/14* (2013.01)

(58) Field of Classification Search
CPC ........ H02K 1/276; H02K 15/03; H02K 21/14; H02K 21/16; H02K 1/02; H02K 1/2766; H02K 1/2713; H01F 13/003; H01F 1/22; H01F 41/0233; H01F 27/255; H01F 27/245

See application file for complete search history.

(56) References Cited

U.S. PATENT DOCUMENTS

| | | | | |
|---|---|---|---|---|
| 2008/0278021 | A1* | 11/2008 | Ley | ...................... H02K 1/2766 310/156.38 |
| 2010/0123426 | A1* | 5/2010 | Nashiki | .................... H02K 1/12 318/701 |
| 2010/0327689 | A1* | 12/2010 | Sakai | ................... H02K 1/2766 310/156.03 |
| 2010/0327787 | A1* | 12/2010 | Sakai | ...................... H02P 21/22 318/400.09 |
| 2012/0181888 | A1* | 7/2012 | Shibukawa | ............ H02K 1/276 310/156.01 |
| 2012/0200186 | A1* | 8/2012 | Sano | .................... H02K 1/2766 310/156.01 |

(Continued)

FOREIGN PATENT DOCUMENTS

JP 2000-134842 A 5/2000

OTHER PUBLICATIONS

Global Dossier.*
IP.com Search Results.*

*Primary Examiner* — Mohamad A Musleh
(74) *Attorney, Agent, or Firm* — Faegre Drinker Biddle & Reath LLP

(57) ABSTRACT

In an IPM motor, since a first portion which is a pressed powder compact made of soft magnetic powder and has a lower magnetic permeability and a lower saturation magnetic flux density than those of a main body portion made of a laminated steel sheet is replaced and disposed in the vicinity of an inner arc side portion of a right end portion of a permanent magnet, local demagnetization is prevented.

2 Claims, 3 Drawing Sheets

(56) References Cited

U.S. PATENT DOCUMENTS

2014/0217849 A1\* 8/2014 Soma .................. H02K 1/276
                                                    310/156.53
2019/0334425 A1\* 10/2019 Taniguchi ............ H02K 21/044
2020/0220400 A1\* 7/2020 Lee .................... H02K 1/2766

\* cited by examiner

ROTATING ELECTRICAL MACHINE

CROSS-REFERENCE TO RELATED APPLICATIONS

This application is based upon and claims the benefit of priority from Japanese Patent Application No. 2019-94023, filed on 17 May 2019, the entire contents of which are incorporated herein by reference.

TECHNICAL FIELD

The present disclosure relates to a rotating electrical machine.

BACKGROUND

In the related art, as a rotating electrical machine, there is known an IPM motor which is one type of inner rotor type motor and in which permanent magnets are embedded in a rotor (for example, Japanese Unexamined Patent Publication No. 2000-134842).

SUMMARY

In the foregoing IPM motor, local demagnetization may occur in the permanent magnet due to a diamagnetic field when the rotor rotates. As a result of intensive research, the inventors have newly found a technique capable of preventing the local demagnetization of the permanent magnet in the rotor.

According to the present disclosure, there is provided a rotating electrical machine preventing demagnetization.

According to one aspect of the present disclosure, there is provided a rotating electrical machine having a rotor rotatable around a predetermined rotational axis and a stator. In the rotating electrical machine, one of the rotor and the stator includes a magnet holding portion and the other includes a coil holding portion. A plurality of permanent magnets are placed in the magnet holding portion and a plurality of coils are placed in the coil holding portion. Each of the permanent magnets extends over an entire length of the magnet holding portion in an axial direction of the rotor. The magnet holding portion includes a main body portion that holds each of the permanent magnets, and a first portion that is positioned on a rear side in the rotational direction between the permanent magnet and an air gap between the rotor and the stator. The first portion has a lower magnetic permeability than a magnetic permeability of the main body portion of the magnet holding portion, and has a lower saturation magnetic flux density than a saturation magnetic flux density of the main body portion of the magnet holding portion.

In the rotating electrical machine, since the first portion has a lower magnetic permeability than the magnetic permeability of the main body portion of the magnet holding portion and has a lower saturation magnetic flux density than the saturation magnetic flux density of the main body portion of the magnet holding portion, compared to when the first portion has the same magnetic permeability and the same saturation magnetic flux density as those of the main body portion of the magnet holding portion, it is possible to further prevent local demagnetization which may occur in an end portion of the permanent magnet on the rear side in the rotational direction when the rotor rotates.

In the rotating electrical machine according to another aspect, the main body portion of the magnet holding portion is made of a laminated steel sheet in which a plurality of silicon steel sheets are stacked one on another in the axial direction of the rotor, and the first portion is a pressed powder compact made of soft magnetic powder.

DETAILED DESCRIPTION

Figure 1:
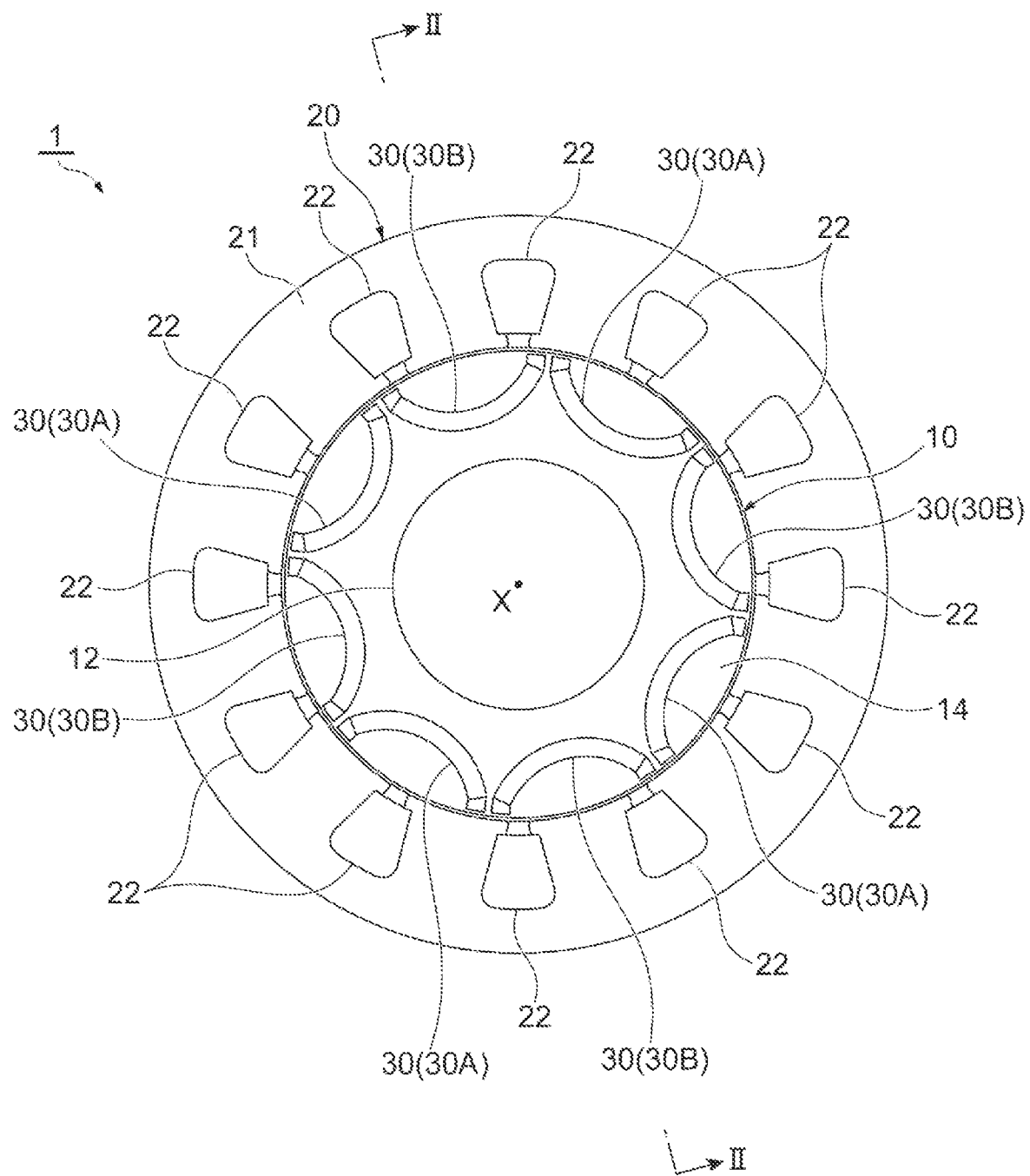
FIG. 1 is a schematic plan view illustrating an IPM motor according to one embodiment.

Hereinafter, various embodiments and examples will be described with reference to the drawings. Incidentally, in the drawings, the same reference signs will be assigned to the same or equivalent portions, and duplicated descriptions will be omitted.

In the following embodiment, a motor (more specifically, IPM motor) will be described as an example of a rotating electrical machine. FIG. 1 illustrates an IPM motor 1 according to an embodiment. FIG. 1 illustrates a plan view of the IPM motor 1 as seen from the direction of an axis X. The IPM motor 1 is an inner rotor type motor which includes a rotor 10 and a stator 20 and in which the rotor 10 is positioned inside the stator 20. The IPM motor 1 has an 8-pole and 12-slot configuration.

The rotor 10 is configured to include a shaft 12 and a rotor core 14 (magnet holding portion).

The shaft 12 has a columnar shape, and extends in a direction perpendicular to the sheet of FIG. 1. The shaft 12 is made of, for example, a stainless steel or the like.

The rotor core 14 has a cylindrical shape, and includes a shaft hole 14a on the inside thereof. The shaft 12 is fitted into the shaft hole 14a of the rotor core 14, and the rotor core 14 and the shaft 12 integrally rotate around the axis X. In the present embodiment, the rotor core 14 has an outer diameter of 158.4 mm and an inner diameter of 85 mm. In addition, a width (namely, a length in the direction of the axis X) of the rotor core 14 is 100 mm.

Figure 2:
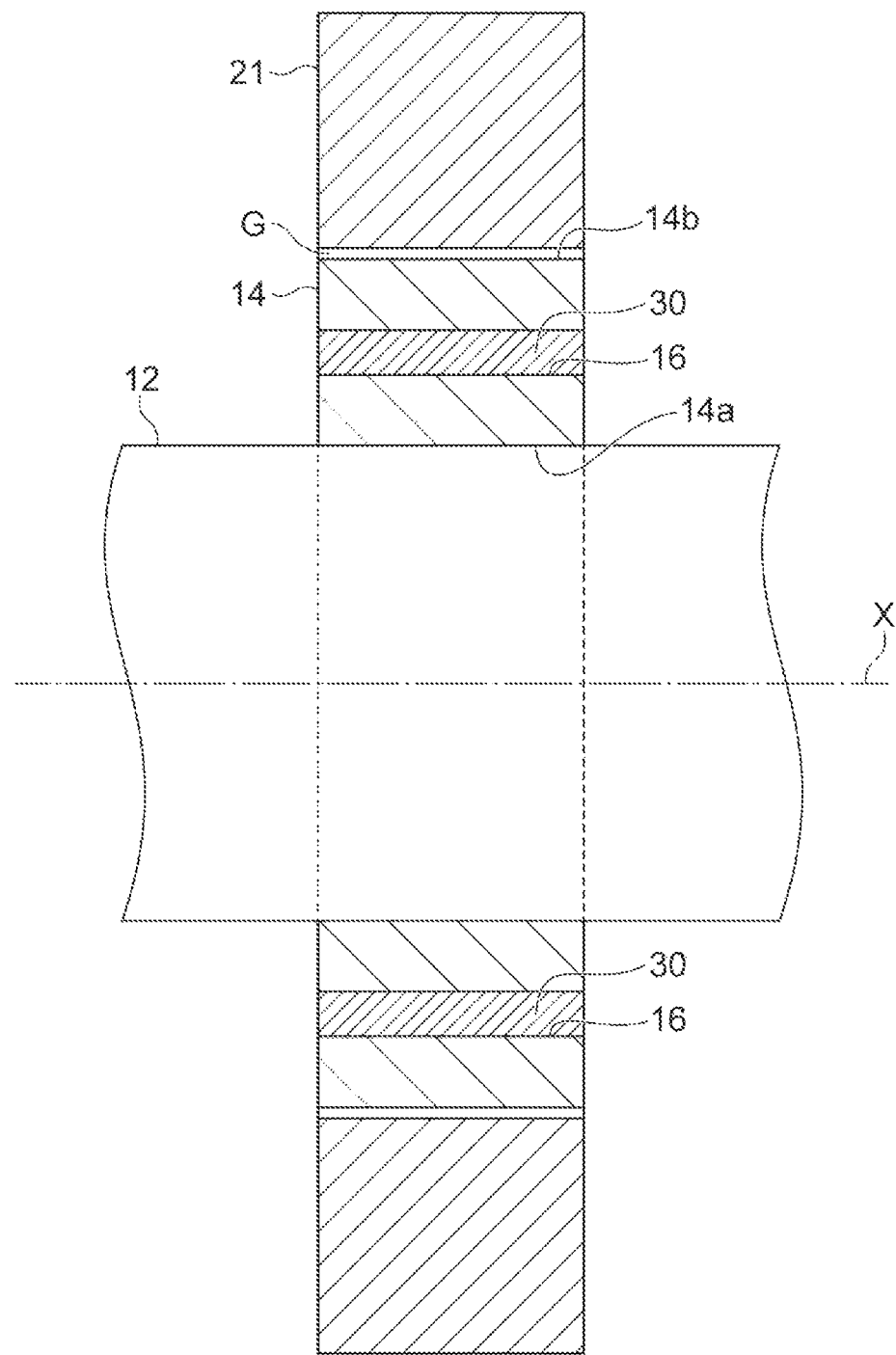
FIG. 2 is a cross-sectional view of the IPM motor illustrated in FIG. 1 as taken along a line II-II.

As illustrated in FIGS. 1 and 2, a plurality of permanent magnets 30 are placed in the rotor core 14. The plurality of permanent magnets 30 can be permanent magnets made of the same material. In the present embodiment, each of the permanent magnets 30 is a rare earth permanent magnet, for example, a neodymium-based sintered magnet. Each of the permanent magnets 30 may be sintered magnets other than the neodymium-based sintered magnet, and may be magnets (for example, a bonded magnet, a hot-worked magnet, and the like) other than the sintered magnet.

Each of the permanent magnets 30 is accommodated in a magnet hole 16 extending parallel to the axis X of the rotor 10. The inner dimension of the magnet hole 16 is designed to be slightly larger than the external dimension of the permanent magnet 30 to be described later. For this reason, the position or the posture of the permanent magnet 30 is not changed in the magnet hole 16.

In the present embodiment, the rotor 10 includes eight permanent magnets 30 having the same shape, and the eight permanent magnets 30 are configured such that pairs of the permanent magnets 30 are disposed at equal angular intervals with respect to the axis X. All of the permanent magnets 30 have an arch shape (or a C-shape) as an end surface shape and a cross-sectional shape as seen from the direction of the axis X, and are disposed such that inner arc sides of the permanent magnets 30 face an outer peripheral surface 14b of the rotor core 14. All of the permanent magnets 30 are radially oriented, and N-pole magnets 30A having N poles on the inner arc sides and S-pole magnets 30B having S poles on the inner arc sides are alternately disposed around the axis X. In the present embodiment, the permanent magnets 30 are not exposed to the outer peripheral surface 14b of the rotor core 14, and are positioned slightly inward from the outer peripheral surface 14b. In the present embodiment, the permanent magnet 30 has a cross-sectional shape where the radius of curvature of the outer arc is 35 mm, the radius of curvature of the inner arc is 28.7 mm, and the opening angle is 100°.

The permanent magnet 30 is disposed in the magnet hole 16 of the rotor core 14 such that an extending direction of the permanent magnet 30 is parallel to the axis X of the rotor 10. As illustrated in FIG. 2, the magnet hole 16 and the permanent magnet 30 extend over the entire length of the rotor core 14 in the direction of the axis X. The length of the permanent magnet 30 in the extending direction is substantially the same as the width of the rotor core 14, and is 100 mm in the present embodiment.

The stator 20 includes a stator core 21 (coil holding portion) that has a cylindrical shape and is provided to surround an outer periphery of the rotor 10. An air gap G (a width of 0.8 mm as one example) having a uniform width is provided between the rotor 10 and the stator 20. A plurality of (twelve in the present embodiment) coils 22 are disposed on an inner peripheral side of the stator core 21. The plurality of coils 22 are disposed at equal angular intervals with respect to the axis X of the rotor 10. When a three-phase alternating current voltage is applied to the plurality of coils 22 from an inverter circuit or the like (not illustrated), a rotating magnetic field occurs on the inner peripheral side of the stator core 21. In the present embodiment, the stator core 21 has an outer diameter of 250 mm and an inner diameter of 160 mm. In addition, a width (namely, a length in the direction of the axis X) of the stator core 21 is 100 mm.

Figure 3:
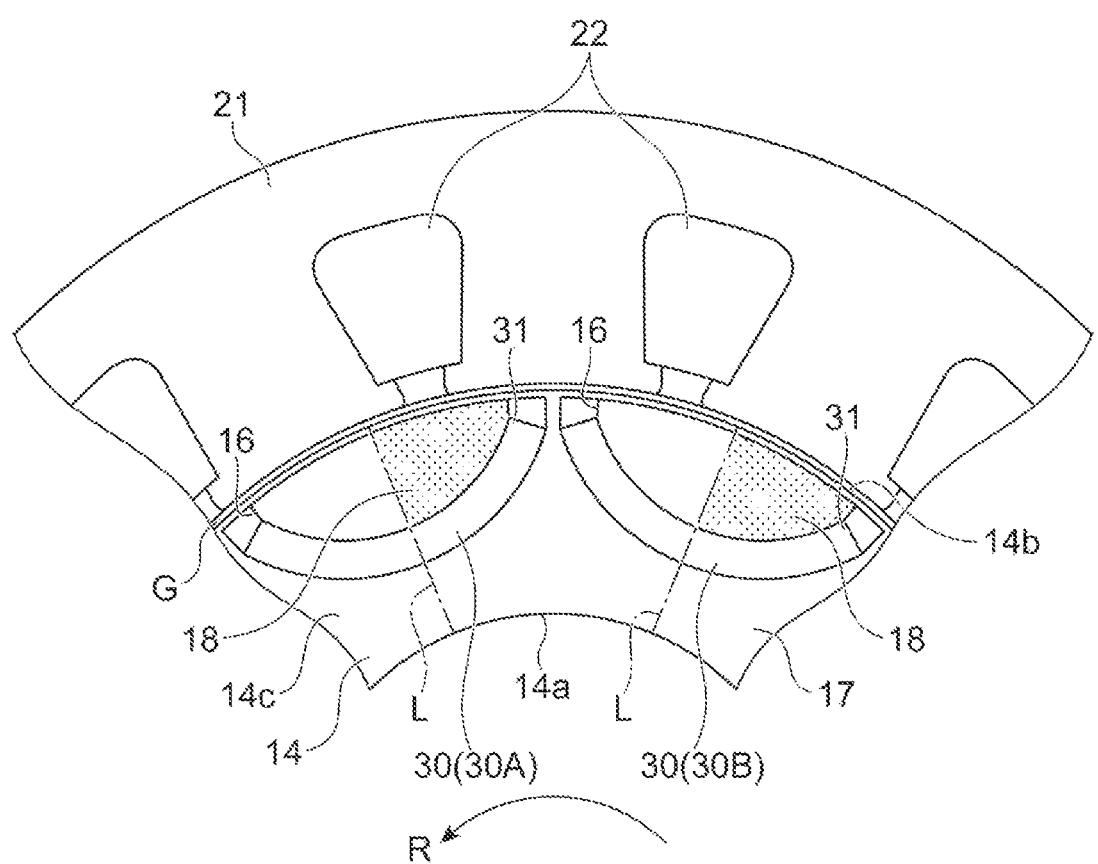
FIG. 3 is a schematic plan view of a main part of the IPM motor illustrated in FIG. 1.

As illustrated in FIG. 3, the rotor core 14 includes a main body portion 17 that holds the permanent magnets 30, and a first portion 18.

The main body portion 17 is made of a laminated steel sheet in which a plurality of steel sheets 19 are stacked one on another in the direction of the axis X. The thickness of each of the steel sheets 19 is, for example, from 0.2 to 0.5 mm A silicon steel sheet can be applied as the steel sheet 19.

The first portion 18 is a portion on a rear side in a rotational direction between the permanent magnet 30 and the air gap G between the rotor and the stator. More specifically, the first portion 18 is a portion that is positioned between the permanent magnet 30 and the air gap G between the rotor and the stator and on the rear side of a bisector L of the opening angle of the permanent magnet 30 in the rotational direction. The first portion 18 is a pressed powder compact made of soft magnetic powder. Pure iron-based magnetic powder such as $Fe_3Si$ powder can be applied as the soft magnetic powder of the pressed powder compact. An average grain size (d50) of the soft magnetic powder of the pressed powder compact is, for example, from 20 to 100 μm. The pressed powder compact is obtained by binding the soft magnetic powder, and a binder such as a resin can be used for binding. The pressed powder compact can be obtained by hot compaction using the soft magnetic powder. When the first portion 18 is a pressed powder compact made of $Fe_3Si$ powder, the magnetic permeability and the saturation magnetic flux density of the first portion 18 are lower than the magnetic permeability and the saturation magnetic flux density of the main body portion 17. The magnetic permeability of the first portion 18 which is a pressed powder compact made of soft magnetic powder is, for example, 500 to 1,000 H/m, and the magnetic permeability of the main body portion 17 made of a laminated steel sheet is, for example, 5,000 to 20,000 H/m (10,000 H/m as one example); however, the magnetic permeabilities are not limited to these numerical ranges.

Here, it is known that in a motor in which permanent magnets are mounted as with the IPM motor 1, due to the rotation of the rotor, a magnetic field opposite to a magnetization direction of the magnets, that is a reverse magnetic field, is partially applied. A region to which the reverse magnetic field is applied varies depending on the disposition of the permanent magnets or the like; however, for example, it is known that the reverse magnetic field is applied to an end portion of the rotor which is on the rear side in the rotational direction (side opposite to the rotational direction). For example, when an arrow R illustrated in FIG. 3 indicates the rotational direction of the rotor 10, it is considered that the reverse magnetic field is applied to the vicinity of an inner arc side portion 31 (namely, an air gap G side portion) of a right end portion of the permanent magnet 30. As described above, the demagnetization of the permanent magnet occurs in the region where the reverse magnetic field occurs, which is a problem.

The inventors have found that when a material having a lower magnetic permeability and a lower saturation magnetic flux density is disposed in the vicinity of the inner arc side portion 31 in the right end portion of the permanent magnet 30, which is a region to which the reverse magnetic field is likely to be applied, local demagnetization is prevented.

In the IPM motor 1 described above, since the first portion 18 which is a pressed powder compact made of soft magnetic powder and has a lower magnetic permeability and a lower saturation magnetic flux density than those of the main body portion 17 made of a laminated steel sheet is replaced and disposed in the vicinity of the inner arc side portion 31 of the right end portion of the permanent magnet 30, the local demagnetization is prevented.

The first portion 18 is not limited to being positioned in the inner arc side portion 31 of the right end portion of the permanent magnet 30, and the dimensions and the shape of the first portion 18 as seen from the axial direction can be appropriately changed.

In the IPM motor 1, a phenomenon where the magnetic force of the permanent magnet 30 decreases (so-called thermal demagnetization) may occur under a high temperature such as when the rotor rotates. In the IPM motor 1, since the first portion 18 which is a pressed powder compact made of soft magnetic powder and has a lower magnetic permeability and a lower saturation magnetic flux density than those of the main body portion 17 made of a laminated steel sheet is replaced and disposed, the thermal demagnetization is also prevented.

The rotating electrical machine according to the present disclosure is not limited to the foregoing embodiment, and can be modified in various forms.

For example, it is possible to appropriately increase or decrease the number of the poles or the number of the slots of the IPM motor. In addition, the end surface shape and the cross-sectional shape of the permanent magnet are not limited to an arch shape; however, the end surface shape and the cross-sectional shape may be a V-shape or the like, and may be a shape where the permanent magnet is divided into a plurality of segments as seen from the direction of the axis X. In the foregoing embodiment, the motor (electric motor) which is one type of rotating electrical machine has been described; however, the present disclosure can be also applied to a generator which is one type of rotating electrical machine.

What is claimed is:

1. A rotating electrical machine comprising a rotor rotatable around a predetermined axis in a predetermined rotational direction and a stator, one of the rotor and the stator includes a magnet holding portion and the other includes a coil holding portion, a plurality of permanent magnets are placed in the magnet holding portion and a plurality of coils are placed in the coil holding portion, wherein each of the permanent magnets extends over an entire length of the magnet holding portion in an axial direction of the rotor, the magnet holding portion includes a main body portion holding each of the permanent magnets, and a first portion positioned on a rear side in the rotational direction between the permanent magnet and an air gap between the rotor and the stator, and the first portion has a lower magnetic permeability than a magnetic permeability of the main body portion of the magnet holding portion, and has a lower saturation magnetic flux density than a saturation magnetic flux density of the main body portion of the magnet holding portion.

2. The rotating electrical machine according to claim 1, wherein the main body portion of the magnet holding portion is made of a laminated steel sheet in which a plurality of silicon steel sheets are stacked one on another in the axial direction of the rotor, and the first portion is a pressed powder compact made of soft magnetic powder.

* * * * *